United States Patent Office 3,510,415
Patented May 5, 1970

3,510,415
MIXTURES OF POLYARYLENE POLYETHERS AND ALPHAOLEFIN/ACRYLONITRILE COPOLYMERS
Bruce P. Barth, Somerville, N.J., assignor to Union Carbide Corporation, a corporation of New York
No Drawing. Filed June 22, 1967, Ser. No. 647,897
Int. Cl. C08f 1/24
U.S. Cl. 204—159.2                                    9 Claims

ABSTRACT OF THE DISCLOSURE

Alpha-olefin acrylonitrile copolymers are blended with thermoplastic polyarylene polyethers to yield mixtures characterized by improved notch impact strength.

BACKGROUND

This invention relates to mixtures of polyarylene polyethers and alpha-olefin/acrylonitrile copolymers characterized by improved notch impact strength.

Polyarylene polyethers are substantially linear thermoplastic polymers that exhibit excellent mechanical, physical, chemical, and electrical properties, and are especially attractive for their superior thermal properties. These polymers can be molded by conventional techniques into shaped articles for a wide variety of end uses. These polymers are ductile, machinable, self-extinguishing, and non-dripping, and are inert to both mineral acid and caustic. More importantly, because of the superior thermal properties of these polymers, they retain their properties at elevated temperatures surpassing the elevated temperature capabilities of prior melt fabricable thermoplastic materials. However, it has been found that polyarylene polyethers are notch sensitive, that is, they exhibit relatively low Izod Impact (ASTM D-256) values as compared to other engineering thermoplastic materials such as polycarbonates for example.

SUMMARY

Unexpectedly, it has now been discovered that polyarylene polyethers are greatly improved in notched impact strength by adding thereto from about 0.1 to about 30 parts by weight, of an alpha-olefin/acrylonitrile copolymer containing from 3 to 70 percent by weight of copolymerized acrylic nitrile having the formula

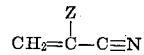

wherein Z is selected from hydrogen or alkyl having from 1 to 10 carbon atoms.

DESCRIPTION

The preferred alpha-olefin in the copolymers employed herein is ethylene although higher alpha-olefins such as propylene, isobutylene, butene-1, pentene-1, hexene-1, 2-ethylhexene-1, neohexene-1, and the like can be used if desired. The preferred acrylonitrile has the above formula wherein Z is hydrogen (herein called "unsubstituted acrylonitrile).

The preparation of alpha-olefin/acrylonitrile copolymers is described by Schildknecht, Vinyl and Related Compounds, John Wiley & Sons Inc., (New York 1952) p. 529, and British Patent No. 951,025.

Thermoplastic polyarylene polyethers used in the present invention are described in U.S. Pat. 3,264,536, issued Aug. 2, 1966, and are linear thermoplastic polymers having a basic structure composed of recurring units having the formula

—O—E—O—E'— wherein E is the residuum of the dihydric phenol and E' is the residuum of the benzenoid compounds having an inert electron withdrawing group in at least one of the positions ortho and para to the valence bonds, and where both of said residua are valently bonded to the ether oxygens through aromatic carbon atoms.

The residua E and E' are characterized in this manner since they are conveniently prepared by the reaction of an alkali metal double salt of a dihydric phenol and a dihalobenzenoid compound having an electron withdrawing group as is described more fully herein.

The residuum E of the dihydric phenol can be, for instance, a mononuclear phenylene group as results from hydroquinone and resorcinol, or it may be a di- or polynuclear residuum. The residuum E can also be substituted with other inert nuclear substituents such as halogen, alkyl, alkoxy and like inert substituents.

It is preferred that the dihydric phenol be a weakly acidic dinuclear phenol such as, for example, the dihydroxy diphenyl alkanes or the nuclear halogenated derivatives thereof, which are commonly known as "bisphenols," such as, for example, the 2,2-bis-(4-hydroxyphenyl)propane, 1,1-bis-4-hydroxyphenyl)-2-phenylethane, bis-(4-hydroxyphenyl)methane, or the chlorinated derivatives containing one or two chlorines on each aromatic ring. Other suitable dinuclear dihydric phenols are the bisphenols of a symmetrical or unsymmetrical joining group as, for example, either oxygen (—O—), carbonyl (—CO—), sulfide (—S—), sulfone (—SO$_2$—), or hydrocarbon residue in which the two phenolic nuclei are joined to the same or different carbon atoms of the residue such as, for example, the bisphenol of acetophenone, the bisphenol of benzophenone, the bisphenol of vinyl cyclohexene, the bisphenol of α-pinene, and the like bisphenols where the hydroxyphenyl groups are bound to the same or different carbon atoms of an organic linking group.

Such dinuclear phenols can be characterized as having the structure:

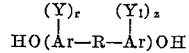

wherein Ar is an aromatic group and preferably is a phenylene group, Y and Y$_1$ can be the same or different inert substituent groups as alkyl groups having from 1 to 4 carbon atoms, halogen atoms, i.e. fluorine, chlorine, bromine, or iodine, or alkoxy radicals having from 1 to 4 carbon atoms, r and z are integers having a value of from 0 to 4 inclusive, and R is representative of a bond between aromatic carbon atoms as in dihydroxydiphenyl, or is a divalent radical, including for example, inorganic radicals as —CO—, —O—, —S—, —S—S—, —SO$_2$—, and divalent organic hydrocarbon radicals such as alkylene, alkylidene, cycloaliphatic, or the halogen, alkyl, aryl or like substituted alkylene, alkylidene and cycloaliphatic radicals as well as alkalicyclic, alkarylene and aromatic radicals and a ring fused to both Ar groups.

Examples of specific dihydric polynuclear phenols include among others: the bis-(hydroxyphenyl)alkanes such as 2,2-bis-(4-hydroxyphenyl)propane, 2,4'-dihydroxydiphenylmethane, bis - (2-hydroxyphenyl)methane, bis - (4-hydroxyphenyl)methane, bis - (4-hydroxy-2,6-dimethyl - 3 - methoxyphenyl)methane, 1,1 - bis-(hydroxyphenyl)ethane, 1,2-bis-(4-hydroxyphenyl)ethane, 1,1-bis-(4-hydroxy-2-chlorophenyl)ethane, 1,1 - bis-(3-methyl-4-hydroxyphenyl)propane, 1,3-bis-(3-methyl - 4 - hydroxyphenyl)propane, 2,2-bis-(3-phenyl-4-hydroxyphenyl)propane, 2,2-bis-(3-isopropyl-4-hydroxyphenyl)propane, 2,2-bis-(2-isopropyl-4-hydroxyphenyl)propane, 2,2-bis-(4-hydroxynaphthyl)propane, 2,2 - bis-(4-hydroxyphenyl)pentane, 3,3-bis-(4-hydroxyphenyl)pentane, 2,2 - bis - (4-hydroxyphenyl) phenylmethane, 2,2-bis-(4-hydroxyphenyl)-1 - phenylpropane, 2,2-bis-(4-hydroxyphenyl)-1,1,1,3,3,3-hexafluoropropane and the like;

Di(hydroxyphenyl)sulfones such as bis-(4-hydroxyphenyl) sulfone, 2,4'-dihydroxydiphenyl sulfone, 5'-chloro-2,4'-dihydroxydiphenyl sulfone, 5'-chloro-4,4'-dihydroxydiphenyl sulfone, and the like;

Di(hydroxyphenyl)ethers such as bis-(4-hydroxyphenyl)-ether, the 4,3'-, 4,2'-, 2,2'-, 2,3'-dihydroxydiphenyl ethers, 4,4'-dihydroxy-2,6-dimethyldiphenyl ether, bis-(4-hydroxy-3-isobutylphenyl)ether, bis-(4-hydroxy-3-isopropylphenyl)ether, bis - (4 - hydroxy-3-chlorophenyl)ether, bis - (4 - hydroxy-3-fluorophenyl) ether, bis-(4-hydroxy-3-bromophenyl)ether, bis-(4-hydroxynaphthyl)ether, bis-(4-hydroxy - 3 - chloronaphthyl)ether, 4,4'-dihydroxy-3,6-dimethoxydiphenyl ether, 4,4' - dihydroxy - 2,5-diethoxydiphenyl ether, and like materials.

It is also contemplated to use a mixture of two or more different dihydric phenols to accomplish the same ends as above. Thus when referred to above the E residuum in the polymer structure can actually be the same or different aromatic residua.

As used herein, the E term defined as being the "residuum of the dihydric phenol" refers to the residue of the dihydric phenol after the removal of the two aromatic hydroxyl groups. Thus it is readily seen that polyarylene polyethers contain recurring groups of the residuum of the dihydric phenol and the residuum of the benzenoid compound bonded through aromatic ether oxygen atoms.

The residuum E' of the benzenoid compound can be from any dihalobenzenoid compound or mixture of dihalobenzenoid compounds which compound or compounds have the two halogens bonded to benzene rings having an electron withdrawing group in at least one of the positions ortho and para to the halogen group. The dihalobenzenoid compound can be either mononuclear where the halogens are attached to the same benzenoid ring or polynuclear where they are attached to different benzenoid rings, as long as there is the activating electron withdrawing group in the ortho or para positions of that benzenoid nucleus.

Any of the halogens may be the reactive halogen substituents on the benzenoid compounds, fluorine and chlorine substituted benzenoid reactants being preferred.

Any electron withdrawing group can be employed as the activator group in the dihalobenzenoid compounds. Preferred are the strong activating groups such as the sulfone group (—SO$_2$—) bonding two halogen substituted benzenoid nuclei as in the 4,4'-dichlorodiphenyl sulfone and 4,4'-difluorodiphenyl sulfone, although such other strong withdrawing groups hereinafter mentioned can also be used with ease. It is further preferred that the ring contain no electron supplying groups on the same benzenoid nucleus as the halogen; however, the presence of other groups on the nucleus or in the residuum of the compound can be tolerated. Preferably, all of the substituents on the benzenoid nucleus are either hydrogen (zero electron withdrawing), or other groups having a positive sigma* value, as set forth in J. F. Burnett in Chem. Rev., 49, 273 (1951) and Quart., Rev., 12, 1 (1958).

The electron withdrawing group of the dihalobenzenoid compound can function either through the resonance of the aromatic ring, as indicated by those groups having a high sigma* value, i.e. above about +0.07 or by induction as in perfluoro compounds and like electron sinks.

Preferably the activating group should have a high sigma* value, preferably about 1.0, although sufficient activity is evidenced in those groups having a sigma* value above 0.7.

The activating group can be basically either of two types:

(a) monovalent groups that activate one or more halogens on the same ring as a nitro group, phenysulfone, or alkylsulfone, cyano, trifluoromethyl, nitroso, and hetero nitrogen as in pyridine.

(b) divalent groups which can activate displacement of halogens on two different rings, such as the sulfone group —SO$_2$—; the carbonyl group —CO—; the vinyl group —CH=CH—; the sulfoxide group —SO—; the azo group —N=N—; the saturated fluorocarbon groups —CF$_2$—CF$_2$; organic phosphine oxides

where R is a hydrocarbon group, and the ethylidene group

where X can be hydrogen or halogen or which can activate halogens on the same ring such as with difluorobenzoquinone, 1,4- or 1,5- or 1,8-difluoroanthraquinone.

If desired, the polymers may be made with mixtures of two or more dihalobenzenoid compounds each of which has this structure, and which may have different electron withdrawing groups. Thus the E' residuum of the benzenoid compounds in the polymer structure may be the same or different.

It is seen also that as used herein, the E' term defined as being the "residuum of the benzenoid compound" refers to the aromatic or benzenoid residue of the compound after the removal of the halogen atoms on the benzenoid nucleus.

From the foregoing, it is evident that preferred linear thermoplastic polyarylene polyethers are those wherein E is the residuum of a dinuclear dihydric phenol and E' is the residuum of a dinuclear benzenoid compound. These preferred polymers then are composed of recurring units having the formula

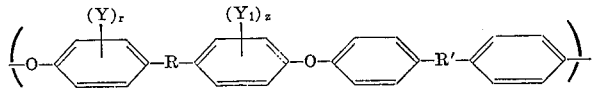

wherein R represents a member of the group consisting of a bond between aromatic carbon atoms and a divalent connecting radical and R' represents a member of the group consisting of sulfone, carbonyl, vinyl, sulfoxide, azo, saturated fluorocarbon, organic phosphine oxide and ethylidene groups and Y and Y$_1$ each represent inert substituent groups selected from the group consisting of halogen, alkyl groups having from 1 to 4 carbon atoms and alkoxy groups having from 1 to 4 carbon atoms and where $r$ and $z$ are integers having a value from 0 to 4 inclusive. Even more preferred are the thermoplastic polyarylene polyethers of the above formula wherein $r$ and $z$ are zero, R is divalent connecting radical

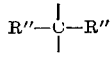

wherein "R" represents a member of the group consisting of hydrogen, lower alkyl, lower aryl, and the halogen substituted groups thereof, and R' is a sulfone group.

Thermoplastic polyarylene polyethers described herein can be prepared as described in the above mentioned U.S. Pat. No. 3,264,536, in a substantially equimolar one-step reaction of a double alkali metal salt of a dihydric phenol with a dihalobenzenoid compound in the presence of specific liquid organic sulfoxide or sulfone solvents under substantially anhydrous conditions. Any alkali metal salt of the dihydric phenol can be used as the one reactant.

Thermoplastic polyarylene polyethers described herein can also be prepared as in Example 1 herein and as described in the aforementioned U.S. Pat. No. 3,264,536, in a two-step process in which a dihydric phenol is first converted in situ in a primary reaction solvent to the alkali metal salt by the reaction with the alkali metal, the alkali metal hydride, alkali metal hydroxide, alkali metal alkoxide or the alkali metal alkyl compounds.

Thermoplastic polyarylene polyethers as described herein are characterized by high molecular weights indicated by reduced viscosity in indicated solvents. For purposes of the present invention, it is preferred that thermoplastic polyarylene polyethers have a reduced viscosity above about 0.35 and most preferably above about 0.4. The manner of determining reduced viscosity is detailed infra.

Admixing the polymeric constituents can be accomplished in any manner as long as a thorough blending of the copolymer and polyarylene polyether is obtained. For example, admixing may be accomplished by a variety of methods normally employed for incorporation of plasticizers or fillers into thermoplastic materials including but not limited to mixing rolls, doughmixers, Banbury mixers, extruders, and other mixing equipment. The resulting mixtures may be handled in any conventional manner employed for the fabrication or manipulation of thermoplastic polymers. The mixtures can be molded using compression injection, calendering and extrusion techniques. Alternatively, the admixing may be accomplished by mixing solutions of the two polymers which may thereafter be treated with a non-solvent to effect coprecipitation. Precipitated mixture may then be recovered in a dry state after filtration to remove the non-solvent and final evaportion of residual solvent. Dry blending a mixture of the individual polymers followed by thermal fusion is a convenient means for producng a conventional molding compound. In this procedure, the dry blend may be extruded and chopped into pellets for subsequent use in injection molding procedures.

It has been found that the incorporation of up to about 40 parts by weight of finely divided silica promotes the formation of a homogeneous mixture.

The mixtures of this invention may contain other additives to plasticize, extend, lubricate, prevent oxidation or lend color to the mixtures. Such additives are well known in the art and may be incorporated without departing from the scope of the invention.

Because of their excellent physical, mechanical, chemical, electrical, and thermal properties, the mixtures of this invention have many and varied uses. For example, they can be used in molding powder formulations either alone or mixed various fillers to make molded parts and articles such as gear, ratchets, bearings, cams, impact parts, gaskets, valve seats, bottles, containers, and the like. They can be used to prepare molded, calendered or extruded articles, films, coatings, threads, filaments, tapes and the like. They can be applied to a broad spectrum of uses in forms of sheets, rods, tapes and the like and are useful in electrical applications.

Because of the adhesive characteristics of the mixtures of this invention, they can be advantageously employed in one or more decorative, protective, structural or bonding capacities to provide structural elements comprising an adherend and an adherent mixture of copolymer and polyarylene polyether as described herein.

The terms "structural element" and "structural elements" as used herein refer to an assembly or assemblies of one or more discrete, planar, curvilinear, rectangular, round or odd shaped objects and a polymeric mixture of this invention. The assembly is characterized by an adhesive bond between a mixture and the object or objects. The terms comprehend, therefore, structural elements comprising an adherend, such as a substrate and an adhering layer of polymeric mixture as in a two-ply laminate or a coated substrate; structural elements comprising an interlayer of polymeric mixture sandwiched between and adhered to two similar or dissimilar adherends or laminae as in a plural ply laminate; structural elements comprising a polymeric mixture matrix surrounding and adhered to as a bond and/or a support for variously shaped and sized adherends such as articles of varying porosities, for example, as the bonding agent and/or substrate in fiber-reinforced plastic articles; structural elements comprising structural members bonded together either closely adjacent or spaced apart by polymeric mixture elements; and combinations of the foregoing. The adherend preferably is readily wettable by the polymeric mixture either because of a polar nature such as characterizes metals, glass and wood and is absent in polyethylene or because of surface treatment or cleanliness or for any other reason.

Adherends having a tangible surface or surfaces, preferably a tangible wettable surface or surfaces, to which polyarylene polyether-copolymer mixtures readily adhere include metals, polar materials, vitreous materials, protein-aceous materials, cutaneous materials, cellulosic materials, natural resins, synthetic organic polymeric material, non-metallic materials, and the like. Adherends can be particulate, granular, fibrous, filamentary, ropy, woven, nonwoven, porous, nonporous, rigid and non-rigid.

Films formed from the mixtures of this invention by conventional techniques are useful as wrapping or packaging materials, as liners, for containers, covers, closures, and the like, as electrical insulating tapes, pipe coverings, and the like.

Because of their desirable electrical properties, the mixtures of this invention can be used as an insulating material for electrical conductors such as wire and cable, as slot insulation in dynamelectric machines, as surface coverings for appliances and the like, as coatings for rods and the like, in wire enamels, varnishes, paints and the like.

It has also been found that irradiation of the alpha-olefin/acrylonitrile copolymers and/or the mixtures of this invention crosslinks the copolymer therein thereby improving toughness. A dosage of from 1 to 20 megareps is usually sufficient to impart improved toughness.

The following examples are intended to further illustrate the present invention without limiting the same in any manner. Parts and percentages given are by weight unless indicated otherwise.

Reduced viscosity (RV) was determined by dissolving a 0.2 gram sample of thermoplastic polyarylene polyether in chloroform contained in a 100 ml. volumetric flask so that the resultant solution measured exactly 100 ml. at 25° C. in a constant temperature bath. The viscosity of 3 ml. of the solution which had been filtered through a sintered glass funnel was determined in an Ostwald or similar type viscometer at 25° C. Reduced viscosity values were obtained from the equation;

$$\text{Reduced viscosity} = \frac{t_s - t_o}{c.t_o}$$

wherein:
$t_o$ is the efflux time of the pure solvent.
$t_s$ is the efflux time of the polymer solution.
$c$ is the concentration of the polymer solution expressed in terms of grams of polymer per 100 ml. of solution.

EXAMPLE 1

Preparation of thermoplastic polyarylene polyether

In a 250 ml. flask equipped with a stirrer, thermometer, a water cooled condenser and a Dean Stark moisture trap filled with benzene, there were placed 11.42 grams of 2,2-bis(4-hydroxyphenyl)propane (0.005 mole), 13.1 grams of a 42.8% potassium hydroxide solution (0.1 mole KOH), 50 ml. of dimethylsulfoxide and 6 ml. benzene and the system purged with nitrogen to maintain an inert atmosphere over the reaction mixture. The mixture was refluxed for 3 to 4 hours, continuously removing the water contained in the reaction mixture as a azeotrope with benzene and distilling off enough of the latter to give a refluxing mixture at 130–135° C. consisting of the dipotassium salt of the 2,2-bis-(4-hydroxyphenyl)propane and dimethylsulfoxide essentially free of water. The mixture was cooled and 14.35 grams (0.05 mole) of 4,4'-dichlorodiphenylsulfone was added followed by 40 ml. of anhydrous dimethylsulfoxide, all under nitrogen pressure. The mixture was heated to 130° and held at 130-140° C. with good stirring for 4-5 hours. The viscous, orange solution was poured into 300 ml. water, rapidly circulating in a Waring Blendor, and the finely divided white polymer was filtered and then dried in a vacuum oven at 100°, for 16 hours. The yield was 22.2 g. (100%) and the reaction was 99% complete based on a titration for residual base.

The polymer had the basic structure

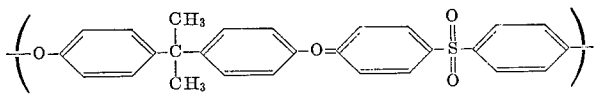

EXAMPLE 2-5

Various amounts of ethylene/acrylonitrile (unsubstituted) copolymers were admixed in a Banbury with polyether prepared as in Example 1. Compression molded samples of these mixtures were tested for Izod impact according to ASTM D-256 with the following results:

| | Percent unsubstituted acrylonitrile in copolymer | Parts ethylene/ acrylonitrile copolymer | Izod impact at 23° C., 1/8" spec. ft.-lbs./in. notch |
| --- | --- | --- | --- |
| Example No.: | | | |
| 2 | 18.7 | 10 | 12.3 |
| 3 | 17 | 10 | 7.7 |
| 4 | 30 | 10 | 13.8 |
| 5 | 30 | ¹10 | 15.3 |
| Control | None | None | 1.1 |

¹ Irradiated with 6 megareps.

EXAMPLE 6

Thermoplastic polyarylene polyether composed of recurring units having the formula

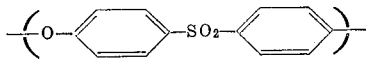

is prepared from 4,4'-dihydroxydiphenylsulfone and 4,4'-dichlorodiphenylsulfone according to the procedure of Example 1. A mixture prepared from this polymer and 3 percent of the copolymer used in Example 2 exhibits an improvement in notched impact strength as compared to the unmodified polymer.

EXAMPLE 7

Thermoplastic polyarylene polyether composed of recurring units having the formula

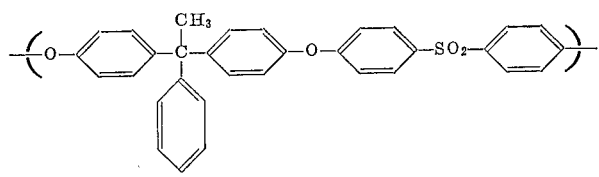

is prepared from the bisphenol of acetophenone and 4,4'-dichlorodiphenylsulfone according to the procedure of Example 1. A mixture prepared from this polymer and 7 percent of the copolymer used in Example 3 exhibits an improvement in notched impact strength as compared to the unmodified polymer.

EXAMPLE 8

Theromplastic polyarylene polyether composed of recurring units having the formula

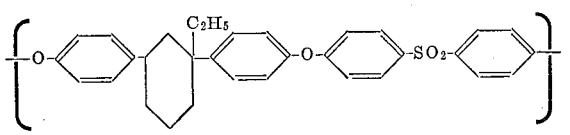

is prepared from the bisphenol of vinyl cyclohexene (prepared by an acid catalyzed condensation of 2 moles of phenol with one mole of vinyl cyclohexene) and 4,4'-dichlorodiphenylsulfone according to the procedure of Example 1. A mixture prepared from this polymer and 20 percent of the copolymer used in Example 4 exhibits an improvement in notched impact strength as compared to the unmodified polymer.

EXAMPLE 9

Thermoplastic polyarylene polyether composed of recurring units having the formula

is prepared from hydroquinone and 4,4'-dichlorodiphenylsulfone according to the procedure of Example 1. A mixture prepared from this polymer and 13 percent of the copolymer used in Example 5 exhibits an improvement in notched impact strength as compared to the unmodified polymer.

EXAMPLE 10

Thermoplastic polyacrylene polyether composed of recurring units having the formula

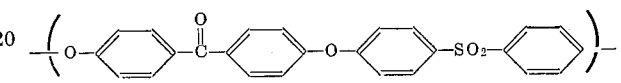

is prepared from 4,4'-dihydroxybenzophenone and 4,4'-dichlorodiphenylsulfone according to the procedure of Example 1. A mixture prepared from this polymer and 10 percent of the copolymer used in Example 2 exhibits an improvement in notched impact strength as compared to the unmodified polymer.

EXAMPLE 11

Thermoplastic polyarylene polyether composed of recurring units having the formula

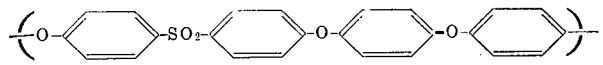

is prepared from 4,4'-dihydroxydiphenylether and 4,4'-dichlorodiphenylsulfone according to the procedure of Example 1. A mixture prepared from this polymer and 2 percent of the copolymer used in Example 5 exhibits an improvement in notched impact strength as compared to the unmodified polymer.

EXAMPLE 12

Thermoplastic polyarylene polyether composed of recurring units having the formula

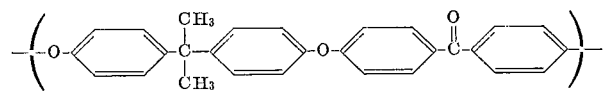

is prepared from 2,2'-bis-(4-hydroxyphenyl)propane and 4,4'-difluorobenzophenone according to the procedure of Example 1. A mixture prepared from this polymer and 30 percent of the copolymer uesd in Example 5 exhibits an improvement in notched impact strength as compared to the unmodified polymer.

What is claimed is:

1. Polymeric mixture characterized by improved impact strength comprising from about 0.1 to about 30 parts by weight of an alpha-olefin-acrylonitrile copolymer containing from 3 to 70 percent by weight of copolymerized acrylonitrile having the formula

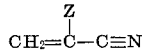

wherein Z is selected from the group consisting of hydrogen and alkyl having from 1 to 10 carbon atoms and a linear thermoplastic polyarylene polyether composed of recurring units having the formula

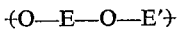

wherein E is the residuum of a dihydric phenol and E' is the residuum of a benzenoid compound having an inert electron withdrawing group in at least one of the positions ortho and para to the valence bonds, and where both of said residua are valently bonded to the ether oxygens through aromatic carbon atoms.

2. Mixture defined in claim 1 wherein said polyarylene polyether is composed of recurring units having the formula

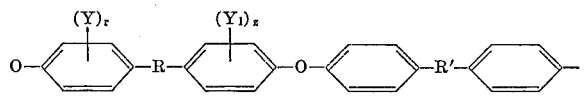

wherein R represents a member of the group consisting of a bond between aromatic carbon atoms and a divalent connecting radical and R' represents a member of the group consisting of sulfone, carbonyl, vinyl, sulfoxide, azo, saturated fluorocarbon, organic phosphine oxide and ethylidene groups and Y and $Y_1$ each represent inert substituent groups selected from the group consisting of halogen, alkyl groups having from 1 to 4 carbon atoms and alkoxy groups having from 1 to 4 carbon atoms and where R and z are integers having a value from 0 to 4 inclusive.

3. Mixture defined in claim 1 wherein said polyarylene polyether is composed of recurring units having the formula

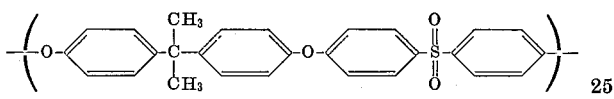

4. Mixture defined in claim 1 wherein said polyarylene polyether is composed of recurring units having the formula

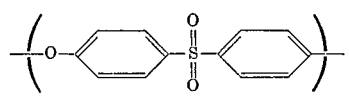

5. Mixture of claim 1 wherein said copolymer, prior to mixing, is irradiated with a dosage of from 1 to 20 megareps.

6. A structural element comprising an adherend and adhering thereto a mixture of from about 0.1 to about 30 parts by weight of an alpha-olefin/acrylonitrile copolymer containing from 3 to 70 percent by weight of copolymerized acryonitrile having the formula

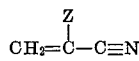

wherein Z is selected from the group consisting of hydrogen and alkyl having from 1 to 10 carbon atoms, and a linear thermoplastic polyarylene polyether composed of recurring units having the formula

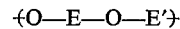

wherein E is the residuum of a dihydric phenol and E' is the residuum of a benzenoid compound having an inert electron withdrawing group in at least one of the positions ortho and para to the valence bonds, and where both of said residua are valently bonded to the ether oxygens through aromatic carbon atoms.

7. Structural element of claim 6 wherein said thermoplastic polyarylene polyether is composed of recurring units having the formula

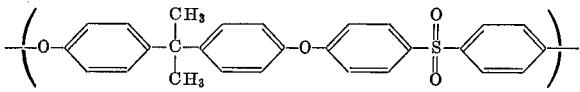

8. Structural element of claim 6 wherein said thermoplastic polyarylene polyether is composed of recurring units having the formula

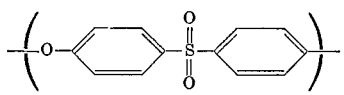

9. Structural element of claim 6 wherein said copolymer prior to mixing is irradiated with a dosage of from 1 to 20 megareps.

References Cited
UNITED STATES PATENTS

| | | | |
|---|---|---|---|
| 3,400,065 | 9/1968 | Barth | 204—159.2 |
| 3,405,199 | 10/1968 | Snecker | 260—887 |

MURRAY TILLMAN, Primary Examiner

R. B. TURER, Assistant Examiner

U.S. Cl. X.R.

260—897, 47, 49; 117—161; 260—41; 161—256